US011017327B2

(12) United States Patent
Zhang et al.

(10) Patent No.: US 11,017,327 B2
(45) Date of Patent: May 25, 2021

(54) SYSTEMS AND METHODS FOR PROVIDING INFORMATION FOR ON-DEMAND SERVICES

(71) Applicant: BEIJING DIDI INFINITY TECHNOLOGY AND DEVELOPMENT CO., LTD., Beijing (CN)

(72) Inventors: Lingyu Zhang, Beijing (CN); Zhihao Ou, Beijing (CN); Dong Guo, Beijing (CN); Qi Song, Beijing (CN); Chengxiang Zhuo, Beijing (CN)

(73) Assignee: BEIJING DIDI INFINITY TECHNOLOGY AND DEVELOPMENT CO., LTD., Beijing (CN)

( * ) Notice: Subject to any disclaimer, the term of this patent is extended or adjusted under 35 U.S.C. 154(b) by 26 days.

(21) Appl. No.: 15/983,076

(22) Filed: May 17, 2018

(65) Prior Publication Data

US 2018/0268324 A1 Sep. 20, 2018

Related U.S. Application Data

(63) Continuation of application No. PCT/CN2017/083594, filed on May 9, 2017.

(30) Foreign Application Priority Data

Nov. 2, 2016 (CN) .......................... 201610951934.2

(51) Int. Cl.
*G06Q 10/02* (2012.01)
*G06Q 50/30* (2012.01)
(Continued)

(52) U.S. Cl.
CPC ....... *G06Q 10/02* (2013.01); *G06Q 10/06311* (2013.01); *G06Q 30/0202* (2013.01);
(Continued)

(58) Field of Classification Search
USPC ................................................ 705/7.11–7.42
See application file for complete search history.

(56) References Cited

U.S. PATENT DOCUMENTS

| 8,392,116 B2 | 3/2013 | Lehmann et al. |
| 2006/0190360 A1 | 8/2006 | Bregman et al. |

(Continued)

FOREIGN PATENT DOCUMENTS

| CN | 103841517 A | 6/2014 |
| CN | 104599217 A | 5/2015 |

(Continued)

OTHER PUBLICATIONS

Burt, David, "Managing Suppliers Up to Speed", Harvard Business Review, Aug. 1989 pp. 1-16.(Joint Ventures Jul.-Aug. 1989 Issue) (Year: 1989).*

(Continued)

*Primary Examiner* — Amber A Misiaszek
(74) *Attorney, Agent, or Firm* — Metis IP LLC

(57) ABSTRACT

The present disclosure relates to systems, methods and non-transitory computer readable media for determining at least one candidate order in response to an on-demand service. The system may include at least one computer-readable storage medium including a set of instructions and at least one processor in communication with the at least one computer-readable storage medium. When executing the set of instructions, the at least one processor is directed to: receive a request associated with a terminal device, the request including at least one of a current time or a current location of the terminal device; obtain a plurality of histori- (Continued)

cal orders associated with the terminal device based on the request; determine at least one candidate order based on the plurality of historical orders and the request; and transmit the at least one candidate order to the terminal device in response to the request.

20 Claims, 7 Drawing Sheets

(51) Int. Cl.
*H04W 4/029* (2018.01)
*G06Q 30/02* (2012.01)
*G06Q 10/06* (2012.01)
*G06Q 30/06* (2012.01)

(52) U.S. Cl.
CPC ......... *G06Q 30/06* (2013.01); *G06Q 30/0635* (2013.01); *G06Q 50/30* (2013.01); *H04W 4/029* (2018.02)

(56) References Cited

U.S. PATENT DOCUMENTS

| | | | | |
|---|---|---|---|---|
| 2013/0132887 A1* | 5/2013 | Amin | ................ | G06Q 30/0284 715/781 |
| 2015/0134244 A1 | 5/2015 | Hershey et al. | | |
| 2016/0078516 A1* | 3/2016 | Alnuwaysir | ....... | G06Q 30/0625 705/26.62 |
| 2017/0011324 A1* | 1/2017 | Truong | ................ | G06Q 50/32 |
| 2017/0046644 A1* | 2/2017 | Zhang | .............. | G06Q 10/06311 |
| 2018/0017405 A1* | 1/2018 | Chen | ........................ | H04W 4/02 |
| 2018/0032928 A1* | 2/2018 | Li | ........................... | G06Q 10/02 |
| 2018/0101877 A1* | 4/2018 | Song | ................ | G01C 21/3492 |

FOREIGN PATENT DOCUMENTS

| | | |
|---|---|---|
| CN | 104796856 A | 7/2015 |
| CN | 104899252 A | 9/2015 |
| CN | 105260455 A | 1/2016 |
| CN | 105426384 A | 3/2016 |
| CN | 105843810 A | 8/2016 |
| CN | 105894359 A | 8/2016 |
| CN | 106919993 A | 7/2017 |
| CN | 106919996 A | 7/2017 |
| JP | 2001043291 A | 2/2001 |

OTHER PUBLICATIONS

Notice of Reasons for Refusal in Japanese Application No. 2018-524286 dated Jun. 18, 2019, 7 pages.
International Search Report for PCT/CN2017/083594 dated Aug. 15, 2017, 5 pages.
Written Opinion of the International Search Authority for PCT/CN2017/083594 dated Aug. 15, 2017, 4 pages.
First Office Action in Chinese Application No. 201610051934.2 dated Mar. 13, 2020, 18 pages.

* cited by examiner

SYSTEMS AND METHODS FOR PROVIDING INFORMATION FOR ON-DEMAND SERVICES

CROSS-REFERENCE TO RELATED APPLICATION

The present disclosure is a continuation of international Application No. PCT/CN2017/083594, filed on May 9, 2017, designating the United States of America, which claims priority of Chinese Application No. CN 201610951934.2 filed on Nov. 2, 2016, the content of which is hereby incorporated by reference in its entirety.

TECHNICAL FIELD

The present disclosure relates generally to systems and methods for providing information for on-demand services, and in particular, systems and methods for determining at least one candidate order in response to an on-demand service.

BACKGROUND

On-demand services become more and more popular. A user of on-demand services may initiate a service order using a mobile application of the on-demand services implemented on a mobile device. To initiate the service order, the user needs to input information related to the on-demand services. Quite often, information that needs to be inputted to initiate the service order during a certain period of time may include same or similar parameters (e.g., departure location, departure time, destination, order type). For example, a user may travel from his/her home to workplace nearly every day between 8 am and 8:30 am. The user may have to repeatedly input the same parameters to initiate the same service order every day. It is desirable to have systems and/or methods to improve the efficiency of completing an on-demand service by for predicting an order for the on-demand services based on the information associated with the user or the user device and recommending the predicted order to the user for confirmation.

SUMMARY

According to an aspect of the present disclosure, a system may include at least one computer-readable storage medium including a set of instructions and at least one processor in communication with the at least one computer-readable storage medium. When executing the instructions, the at least one processor is directed to: receive a request associated with a terminal device, the request including at least one of a current time or a current location of the terminal device; obtain a plurality of historical orders associated with the terminal device based on the request; determine at least one candidate order based on the plurality of historical orders and the request; and transmit the at least one candidate order to the terminal device in response to the request. The plurality of historical orders may include at least one of: a first set of historical orders, each having a historical departure time within a predetermined time range based on the current time of the terminal device; or a second set of historical orders, each having a historical departure location within a predetermined geographical range based on the current location of the terminal device.

According to an aspect of the present disclosure, a method implemented on a computing device having at least one processor, at least one computer-readable storage medium, and a communication platform connected to a network may include: receiving a request associated with a terminal device, the request including at least one of a current time or a current location of the terminal device; obtaining a plurality of historical orders associated with the terminal device based on the request; determining at least one candidate order based on the plurality of historical orders and the request; and transmit the at least one candidate order to the terminal device in response to the request. The plurality of historical orders may include at least one of: a first set of historical orders, each having a historical departure time within a predetermined time range based on the current time of the terminal device; or a second set of historical orders, each having a historical departure location within a predetermined geographical range based on the current location of the terminal device.

According to an aspect of the present disclosure, a non-transitory computer readable medium may include instructions configured to cause a computing system to: receive a request associated with a terminal device, the request including at least one of a current time or a current location of the terminal device; obtain a plurality of historical orders associated with the terminal device based on the request; determine at least one candidate order based on the plurality of historical orders and the request; and transmit the at least one candidate order to the terminal device in response to the request. The plurality of historical orders may include at least one of: a first set of historical orders, each having a historical departure time within a predetermined time range based on the current time of the terminal device; or a second set of historical orders, each having a historical departure location within a predetermined geographical range based on the current location of the terminal device.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
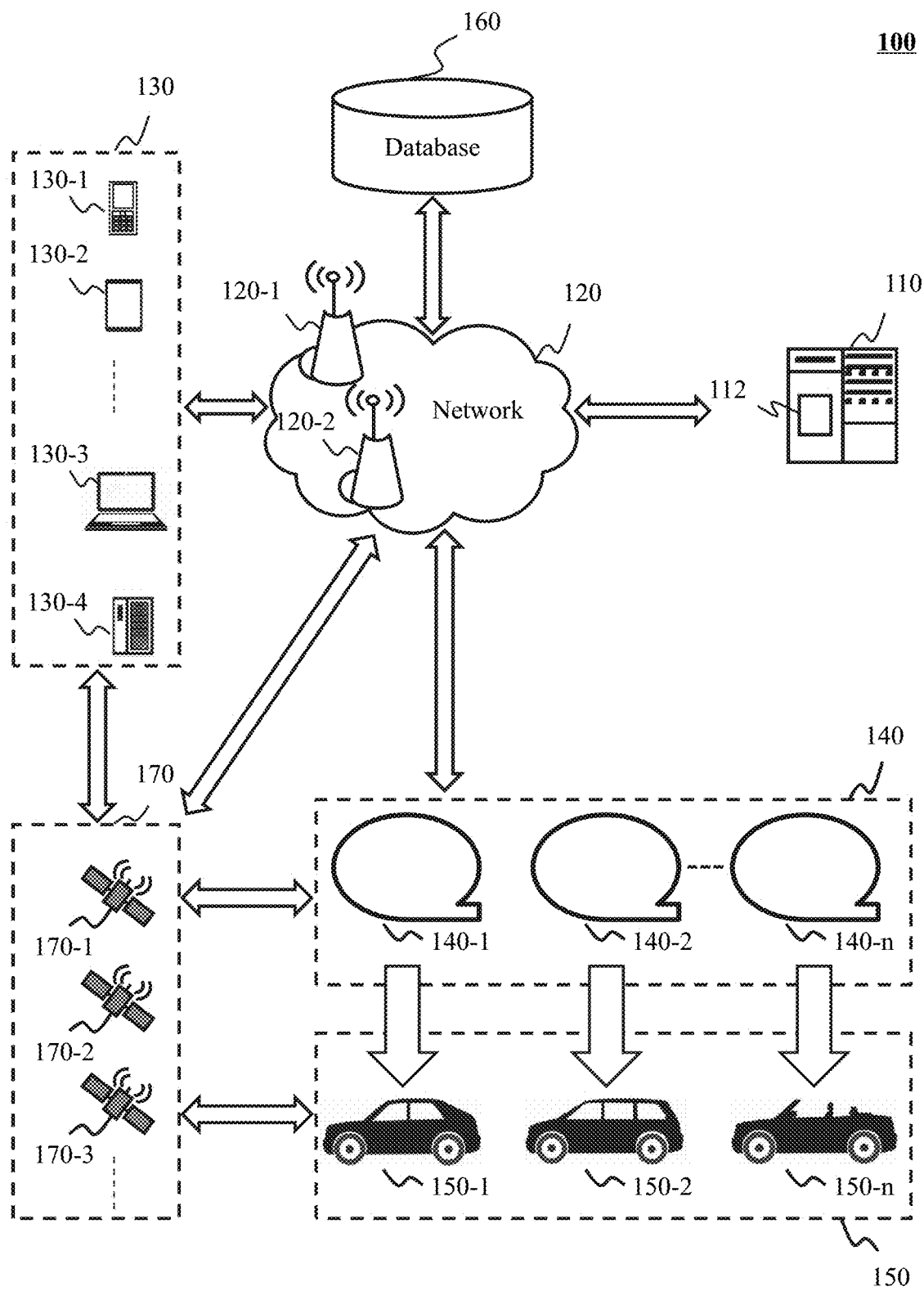
FIG. 1 illustrates an exemplary network environment of providing an on-demand service, according to some embodiments.

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of the present disclosure. It is to be expressly understood, however, that the drawings are for purposes of illustration and description only and are not intended to limit the scope of the present disclosure. It is understood that the drawings are not to scale.

The flowcharts used in the present disclosure illustrate operations that systems implement according to some embodiments in the present disclosure. It is to be expressly understood, the operations of the flowchart may be implemented not in order. Conversely, the operations may be implemented in inverted order, or simultaneously. Moreover, one or more other operations may be added to the flowcharts. One or more operations may be removed from the flowcharts.

Moreover, while the system and method in the present disclosure is described primarily in regard to determining at least one candidate order for a transportation service, it should also be understood that the present disclosure is not intended to be limiting. The system or method of the present disclosure may be applied to any other kind of service. For example, the system or method of the present disclosure may be applied to transportation systems of different environments including land, ocean, aerospace, or the like, or any combination thereof. The vehicle of the transportation systems may include a taxi, a private car, a hitch, a bus, a train, a bullet train, a high speed rail, a subway, a vessel, an aircraft, a spaceship, a hot-air balloon, a driverless vehicle, or the like, or any combination thereof. The transportation system may also include any transportation system for management, for example, a system for sending and/or receiving an express. The application of the system or method of the present disclosure may be implemented on a user device and include a webpage, a plug-in of a browser, a client terminal, a custom system, an internal analysis system, an artificial intelligence robot, or the like, or any combination thereof.

The term "passenger," "requestor," "service requestor," and "user" in the present disclosure are used interchangeably to refer to an individual, an entity, or a tool that may request or order a service. Also, the term "driver," "provider," and "service provider" in the present disclosure are used interchangeably to refer to an individual, an entity, or a tool that may provide a service or facilitate the providing of the service.

The term "service request," "request for a service," "requests," and "order" in the present disclosure are used interchangeably to refer to a request that may be initiated by a passenger, a service requestor, a user, a driver, a provider, a service provider, or the like, or any combination thereof. The service request may be accepted by any one of a passenger, a service requestor, a user, a driver, a provider, or a service provider. The service request may be chargeable or free.

The term "driver equipment" in the present disclosure is used to refer to a mobile terminal that is used by a service provider to provide a service or facilitate the providing of the service. The term "terminal device" in the present disclosure is used to refer to a mobile terminal that is used by a service requestor to request or order a service.

The positioning technology used in the present disclosure may be based on a global positioning system (GPS), a global navigation satellite system (GLONASS), a compass navigation system (COMPASS), a Galileo positioning system, a quasi-zenith satellite system (QZSS), a wireless fidelity (WiFi) positioning technology, or the like, or any combination thereof. One or more of the above positioning systems may be used interchangeably in the present disclosure.

According to an aspect of the present disclosure, systems and methods for determining at least one candidate order are provided. The systems obtain a current time, a current location from a mobile device of a user. The systems determine historical orders initiated near the current time or near the current location. The systems determine one or more candidate orders based on the historical orders. The systems transmit the one or more candidate orders as suggestions to the mobile device. The user may give feedbacks, for example, choosing, modifying, or confirming the candidate orders without too much manipulation or inputting. The systems generate a service order based on the feedback from the user. By predicting and suggesting the candidate orders to the user, the efficiency of the transportation service is enhanced. Since the user is free from inputting too much information, the user experience is also improved.

It should be noted that the online on-demand transportation service, such as online taxi hailing, is a newly emerged service rooted in post-Internet era. It provides the technical solutions to the passengers and drivers that could raise only in post-Internet era. In the pre-Internet era, when a passenger hails a taxi on the street, the taxi driver may have no knowledge of the destination of the passenger. If the passenger hails a taxi through a telephone call, it may be necessary for the service provider (e.g., a taxi company or an agent) to talk with the passenger to know the destination and the departure time. However, the online on-demand transportation system is able to predict parameters related to the service request (e.g., a destination, a departure time, a departure location, an order type, etc.) before the user sends the real-time service request. The online on-demand transportation system sends at least one candidate service order to the user and waits for the user's feedbacks. The user only needs to confirm, modify, or select the candidate service order from the online on-demand transportation system. By predicting the information related to the service order, the online on-demand transportation system may provide a convenient and efficient service to the user and enhance the user experience. Also, the process for generating a service order may be simplified and the time consumption may be reduced. Therefore, through Internet, the online on-demand transportation systems may provide a much more convenient and efficient transaction platform for the passengers that may never be met in a traditional pre-Internet transportation service system.

FIG. 1 illustrates an exemplary network environment of providing an on-demand service according to some embodiments. An on-demand service system 100 may be an online transportation service platform implemented in a network environment with a positioning system for providing transportation services. The on-demand service system 100 may include a server 110, a network 120, a terminal device 130, a driver equipment 140, a vehicle 150, and a database 160. The one-demand service system 100 may further communicately connect to a positioning system 170.

The on-demand service system 100 may provide a plurality of services. Exemplary on-demand service may include a taxi hailing service, a chauffeur service, an express car service, a carpool service, a bus service, a driver hire service, and a shuttle service. In some embodiments, an on-demand service may be provided with one or more recommended types of orders to perform the on-demand service. The order types may include a taxi order, a luxury car order, an express car order, a bus order, a shuttle order, etc. In some embodiments, the service may be any on-line service, such as booking a meal, shopping, or the like, or a combination thereof.

The server 110 may be a computer server. The server 110 may communicate with the terminal device 130 and/or the driver equipment 140 to provide various functionality of an online on-demand service. In some embodiments, the server 110 may be a single server, or a server group. The server group may be a centralized server group connected to the network 120 via an access point, or a distributed server group connected to the network 120 via one or more access points, respectively. In some embodiments, the server 110 may be locally connected to the network 120 or in remote connection with the network 120. For example, the server 110 may access information and/or data stored in the terminal device 130, the driver equipment 140, and/or the database 160 via the network 120. As another example, the database 160 may serve as backend data storage of the server 110. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device 200 having one or more components illustrated in FIG. 2 in the present disclosure.

In some embodiments, the server 110 may include a processing engine 112. The processing engine 112 may process information and/or data related to perform one or more functions described in the present disclosure. For example, the processing engine 112 may determine one or more candidate orders based on a plurality of historical orders associated with the terminal device 130. In some embodiments, the processing engine 112 may include one or more processing units (e.g., single-core processing engine(s) or multi-core processing engine(s)). Merely by way of example, the processing engine 112 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

The network 120 may facilitate exchange of information and/or data. In some embodiments, one or more components in the on-demand service system 100 (e.g., the server 110, the terminal device 130, the driver equipment 140, the vehicle 150, the database 160) may send information and/or data to other component(s) in the on-demand service system 100 via the network 120. For example, the server 110 may obtain a plurality of historical orders from the database 160 via the network 120. In some embodiments, the network 120 may be any type of wired or wireless network, or combination thereof. Merely by way of example, the network 120 may include a cable network, a wireline network, an optical fiber network, a tele communications network, an intranet, an Internet, a local area network (LAN), a wide area network (WAN), a wireless local area network (WLAN), a metropolitan area network (MAN), a wide area network (WAN), a public telephone switched network (PSTN), a Bluetooth network, a ZigBee network, a near field communication (NFC) network, or the like, or any combination thereof. In some embodiments, the network 120 may include one or more network access points. For example, the network 120 may include wired or wireless network access points such as base stations and/or internet exchange points 120-1, 120-2, . . . , through which one or more components of the on-demand service system 100 may be connected to the network 120 to exchange data and/or information.

In some embodiments, a passenger may be an owner of the terminal device 130. In some embodiments, the owner of the terminal device 130 may be someone other than the passenger. For example, an owner A of the terminal device 130 may use the terminal device 130 to send a service request for a passenger B, and/or receive a service confirmation and/or information or instructions from the server 110. In some embodiments, a driver may be a user of the driver equipment 140. In some embodiments, the user of the driver equipment 140 may be someone other than the driver. For example, a user C of the driver equipment 140 may use the driver equipment 140 to receive a service request for a driver D, and/or information or instructions from the server 110. In some embodiments, a driver may be assigned to use one of the driver equipment 140 and/or one of the vehicles 150 for at least a certain period of time, for example, a day, a week, a month, or a year etc. In some other embodiments, a driver may be assigned to use one of the driver equipment 140 and/or one of the vehicles 150 on a random basis. For example, when a user is available to respond to an on-demand service, he/she may be assigned to use a driver terminal that receives the earliest request and a vehicle that is recommended to perform the type of on-demand service. In some embodiments, "passenger" and "terminal device" may be used interchangeably, and "driver" and "driver equipment" may be used interchangeably. In some embodiments, the driver equipment may be associated with one or more drivers (e.g., a night-shift driver, or a day-shift driver).

In some embodiments, the terminal device 130 may include a mobile device 130-1, a tablet computer 130-2, a laptop computer 130-3, a built-in device in a vehicle 130-4, or the like, or any combination thereof. In some embodiments, the mobile device 130-1 may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a smart bracelet, a smart footgear, a smart glass, a smart helmet, a smart watch, smart clothing, a smart backpack, a smart accessory, or the like, or any combination thereof. In some embodiments, the smart mobile device may include a smartphone, a personal digital assistance (PDA), a gaming device, a navigation device, a point of sale (POS) device, or the like, or any combination thereof. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google Glass, an Oculus Rift, a Hololens, a Gear VR, etc. In some embodiments, built-in device in the vehicle 130-4 may include an onboard computer, an onboard television, etc. In some embodiments, the terminal device 130 may be a device with positioning technology for locating the position of the passenger and/or the terminal device 130.

The driver equipment 140 may include a plurality of driver equipments 140-1, 140-2, . . . , 140-n. In some embodiments, the driver equipment 140 may be similar to, or the same device as the terminal device 130. In some embodiments, the driver equipment 140 may be customized to implement the online transportation service. In some embodiments, the driver equipment 140 and the terminal device 130 may be configured with signal receivers to receive position information of the driver equipment 140 and the terminal device 130 from the positioning system 170. In some embodiments, the terminal device 130 and/or the driver equipment 140 may communicate with other positioning device to determine the position of the passenger, the terminal device 130, the driver, and/or the driver equipment 140. In some embodiments, the terminal device 130 and/or the driver equipment 140 may periodically send the positioning information to the server 110. In some embodiments, the driver equipment 140 may also periodically send the availability status to the server 110. The availability status may indicate whether a vehicle 150 associated with the driver equipment 140 is available to transport a passenger. For example, the terminal device 130 may send the positioning information to the server 110 every thirty minutes. As another example, the driver equipment 140 may send the availability status to the server every thirty minutes, and/or upon an on-demand service is completed. As another example, the terminal device 130 may send the positioning information to the server 110 each time the user logs into the mobile application associated with the online on-demand service.

In some embodiments, the driver equipment 140 may correspond to one or more vehicles 150. The vehicles 150 may carry the passenger and travel to the destination. The vehicles 150 may include a plurality of vehicles 150-1, 150-2, . . . , 150-n. One vehicle may correspond to one order type. The order types may include a taxi order, a luxury car order, an express car order, a bus order, a shuttle order, etc.

The database 160 may store data and/or instructions. In some embodiments, the database 160 may store data obtained from the terminal device 130 and/or the driver equipment 140. For example, the database 160 may store historical orders associated with the terminal device 130. In some embodiments, the database 160 may store data and/or instructions that the server 110 may execute to provide the on-demand services described in the present disclosure. In some embodiments, database 160 may include a mass storage, a removable storage, a volatile read-and-write memory, a read-only memory (ROM), or the like, or any combination thereof. Exemplary mass storage may include a magnetic disk, an optical disk, a solid-state drives, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, the database 160 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, one or more components in the on-demand service system 100 may access the data or instructions stored in the database 160 via the network 120. In some embodiments, the database 160 may be directly connected to the server 110 as a backend storage.

In some embodiments, one or more components in the on-demand service system 100 (e.g., the server 110, the terminal device 130, the driver equipment 140, etc.) may have permissions to access the database 160. In some embodiments, one or more components in the on-demand service system 100 may read and/or modify the information related to the passenger, the driver, the vehicle, and/or the on-demand service providers when one or more conditions are met. For example, the server 110 may read and/or modify one or more passengers' information after an on-demand service is completed.

The positioning system 170 may determine information associated with an object, for example, one or more of the terminal device 130, the driver equipment 140, the vehicle 150, etc. For example, the positioning system 170 may determine a current time and a current location of the terminal device 130. In some embodiments, the positioning system 170 may be a global positioning system (GPS), a global navigation satellite system (GLONASS), a compass navigation system (COMPASS), a BeiDou navigation satellite system, a Galileo positioning system, a quasi-zenith satellite system (QZSS), etc. The information may include a location, an elevation, a velocity, or an acceleration of the object, and/or a current time. The location may be in the form of coordinates, such as, latitude coordinate and longitude coordinate, etc. The positioning system 170 may include one or more satellites, for example, a satellite 170-1, a satellite 170-2, and a satellite 170-3. The satellites 170-1 through 170-3 may determine the information mentioned above independently or jointly. The positioning system 170 may send the information mentioned above to the network 120, the terminal device 130, the driver equipment 140, or the vehicle 150 via wireless connections.

In some embodiments, information exchanging between one or more components of the on-demand service system 100 may be initiated by way of launching the mobile application of the on-demand services on a terminal device or requesting a service via the terminal device (e.g., generating a current order). The object of the service request may be any product. In some embodiments, the product may include food, medicine, commodity, chemical product, electrical appliance, clothing, car, housing, luxury, or the like, or any combination thereof. In some other embodiments, the product may include a service product, a financial product, a knowledge product, an internet product, or the like, or any combination thereof. The internet product may include an individual host product, a web product, a mobile internet product, a commercial host product, an embedded product, or the like, or any combination thereof. The mobile internet product may be used in a software of a mobile terminal, a program, a system, or the like, or any combination thereof. The mobile terminal may include a tablet computer, a laptop computer, a mobile phone, a personal digital assistance (PDA), a smart watch, a point of sale (POS) device, an onboard computer, an onboard television, a wearable device, or the like, or any combination thereof. For example, the product may be any software and/or application used in the computer or mobile phone. The software and/or application may relate to socializing, shopping, transporting, entertainment, learning, investment, or the like, or any combination thereof. In some embodiments, the software and/or application related to transporting may include a traveling software and/or application, a vehicle scheduling software and/or application, a mapping software and/or application, etc. In the vehicle scheduling software and/or application, the vehicle may include a horse, a carriage, a rickshaw (e.g., a wheelbarrow, a bike, a tricycle, etc.), a car (e.g., a taxi, a bus, a private car, etc.), a train, a subway, a vessel, an aircraft (e.g., an airplane, a helicopter, a space shuttle, a rocket, a hot-air balloon, etc.), or the like, or any combination thereof.

Figure 2:
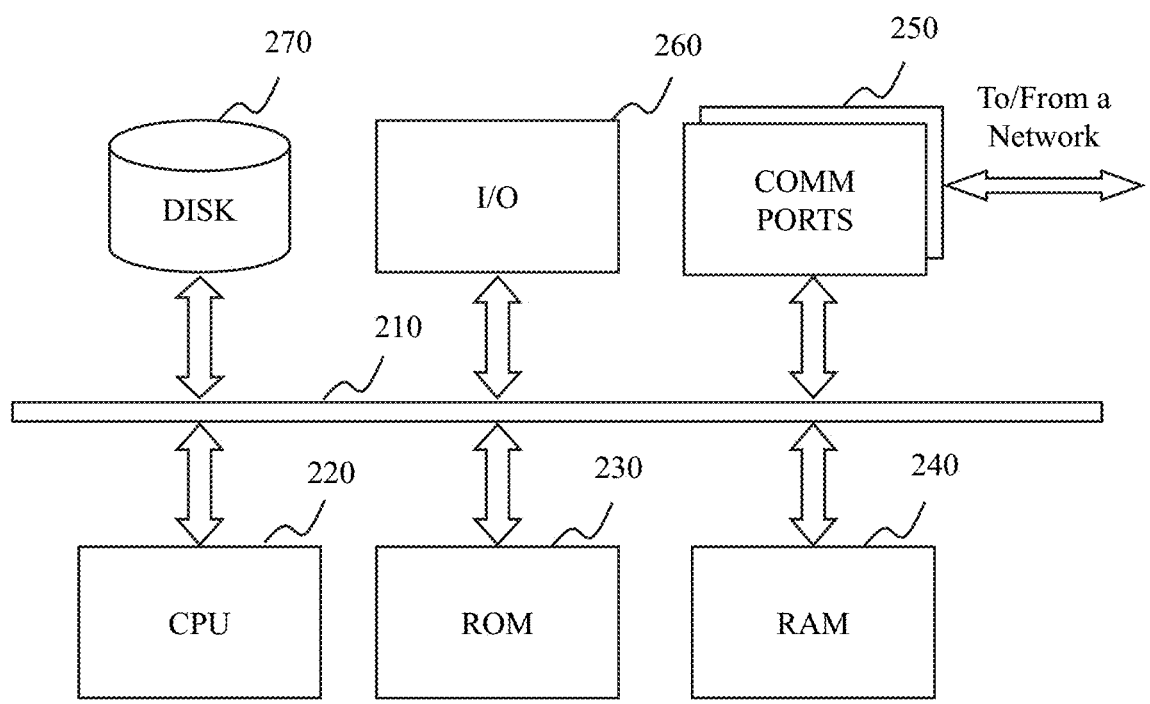
FIG. 2 illustrates an exemplary computing device on which the on-demand service system can be implemented, according to some embodiments of the present disclosure.

FIG. 2 illustrates an exemplary computing device 200 on which the on-demand service system can be implemented, according to some embodiments of the present disclosure.

The computing device 200 may be a general purpose computer or a special purpose computer. Both may be used to implement an on-demand system of the present disclosure. The computing device 200 may be used to implement any component of the service as described herein. For example, the processing engine 112 of the server may be implemented on the computing device 200, via its hardware, software program, firmware, or a combination thereof. Although only one such computer is shown for convenience, the computer functions related to the service as described herein may be implemented in a distributed manner on a number of similar platforms to distribute the processing load.

The computing device 200, for example, may include COM ports 250 connected to and from a network (e.g., the network 120) connected thereto to facilitate data communications. The computing device 200 may also include a central processing unit (CPU) 220, in the form of one or more processors, for executing program instructions. The exemplary computer platform may include an internal communication bus 210, program storage and data storage of different forms, for example, a disk 270, and a read only memory (ROM) 230, or a random access memory (RAM) 240, for various data files to be processed and/or transmitted by the computer. The exemplary computer platform may also include program instructions stored in the ROM 230, the RAM 240, and/or other type of non-transitory storage medium to be executed by the CPU 220. The methods and/or processes of the present disclosure may be implemented as the program instructions. The computing device 200 also includes an I/O component 260, supporting input/output between the computer and other components therein. The computing device 200 may also receive programming and data via network communications.

Merely for illustration, only one CPU and/or processor is described in the computing device 200. However, it should be noted that the computing device 200 in the present disclosure may also include multiple CPUs and/or processors, thus operations and/or method steps that are performed by one CPU and/or processor as described in the present disclosure may also be jointly or separately performed by the multiple CPUs and/or processors. For example, the CPU and/or processor of the computing device 200 executes both step A and step B. As in another example, step A and step B may also be performed by two different CPUs and/or processors jointly or separately in the computing device 200 (e.g., the first processor executes step A and the second processor executes step B, or the first and second processors jointly execute steps A and B).

Figure 3:
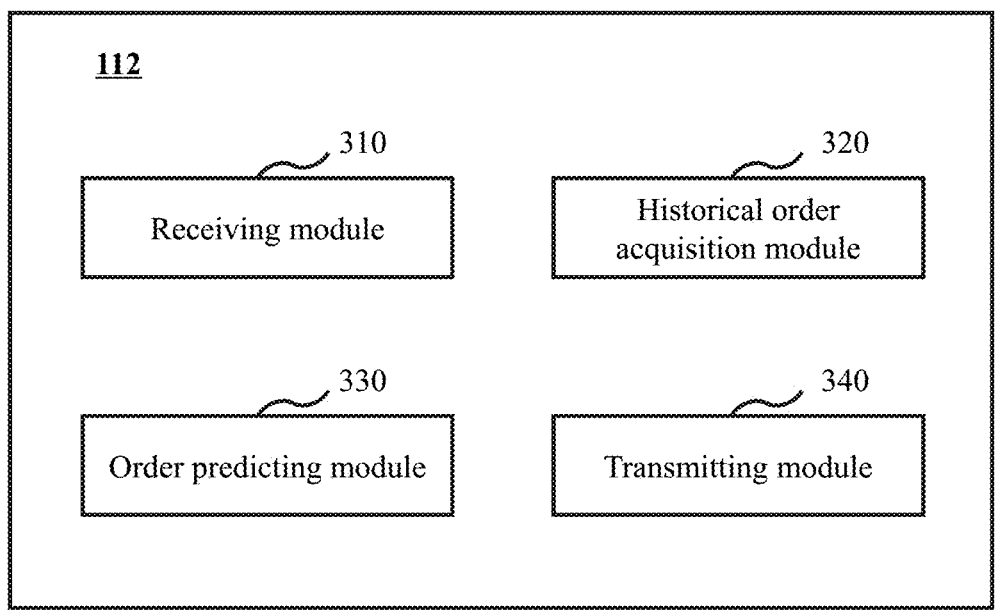
FIG. 3 illustrates an exemplary processing engine, according to some embodiments of the present disclosure.

FIG. 3 illustrates an exemplary processing engine 112 according to some embodiments of the present disclosure. The processing engine 112 of the server 110 may include a receiving module 310, a historical order acquisition module 320, an order predicting module 330, and a transmitting module 340. One or more modules in the processing engine 112 may be implemented by at least one processor, such as the CPU 220.

The receiving module 310 may obtain/receive one or more requests for on-demand services from one or more terminal devices 130. In some embodiments, the request may be initiated by launching a service application installed in the terminal device 130, or manipulating one or more items (icons, buttons, etc.) on a user interface of the service application. The request may include temporal information and/or geographical information. The temporal information may include a current time. In some embodiments, the current time may include a current time of day and/or a current date. For example, the current time of day may be 11:00 a.m. and the current date may be Mar. 23, 2017. Thus, the current time may be 11:00 a.m. of Mar. 23, 2017. In some embodiments, the current time may be obtained from the terminal device 130 or the server 110. In some embodiments, the current date may be classified to a date category. The date category may include a workday, a weekend, a holiday, etc. The geographical information may include a current location associated with the terminal device 130. In some embodiments, the current location associated with the terminal device 130 may be determined by the positioning system 170. The current location may be classified to a location category. The location category may include a home, a workplace, a hotel/resort, a natural forest, etc.

The processing engine 112 may determine at least one candidate order to recommend to the passenger based on the request. The at least one candidate order may include, for example, at least one candidate departure time, at least one candidate departure location, at least one candidate destination, at least one candidate order type, etc. In some embodiments, the receiving module 310 may receive from the terminal device 130, the passenger's feedback related to the at least one candidate order. The feedback may include a selection of one candidate order among the at least one candidate order, information that modifies the at least one candidate order, information that confirms the at least one candidate order, or a combination thereof. The information that modifies the at least one candidate order may include the modification to candidate departure time, the modification to candidate departure location, the modification to candidate destination, the modification to candidate order type, etc. The information that confirms the at least one candidate order may be used to generate a service order at the on-demand service system.

The historical order acquisition module 320 may obtain/acquire a plurality of historical orders associated with the terminal device 130. In some embodiments, the historical order acquisition module 320 may determine the plurality of historical orders based on the request (e.g., the current time, the current location, etc.).

In some embodiments, the plurality of historical orders may include historical orders associated with a historical departure time within a predetermined time range encompassing the current time. The time range may include a first time interval (e.g., 30 min, 60 min, 90 min, etc.) before the current time and a second time interval (e.g., 30 min, 60 min, 90 min, etc.) after the current time. The first time interval and the second time interval may be the same or different. For example, when the current time is 7:20 p.m., the predetermined time range may be from 6:00 to 9:00 p.m. The first time interval and the second time interval are 80 min and 100 min, respectively. In some embodiments, the plurality of historical orders may include historical orders associated with the same date category of the current date. For example, when the current date is a holiday, the historical order acquisition module 320 may determine a plurality of historical orders accomplished on the past holidays.

In some embodiments, the plurality of historical orders may be associated with a historical departure location within a predetermined geographical range encompassing the current location. In some embodiments, the predetermined geographical range may be a region encompassing the current location (e.g., a rectangle, a polygon, a circle, or any other shaped region). The geographical range may be a range of a predetermined distance (e.g., 100 meters, 200 meters, etc.) from the current location.

The order predicting module 330 may determine at least one candidate order. The at least one candidate order may include, at least one candidate departure time, at least one candidate departure location, at least one candidate destination, at least one candidate order type, at least one candidate cost, etc. The candidate departure time may be the same as or different from the current time associated with the terminal device 130. The candidate cost may be determined based on the at least one of the candidate departure time, the candidate departure location, the candidate destination, or the candidate order type. The order predicting module 330 may determine the at least one candidate order based on the plurality of historical orders and the request. In some embodiments, the order predicting module 330 may rank the plurality of historical orders according to a first rule. The order predicting module 330 may further determine the at least one candidate order based on the ranking of the plurality of historical orders. The first rule may relate to evaluation of the historical orders. The evaluation may be based on a rating for each of the plurality of historical orders. For example, the first rule to rank the plurality of historical orders may be determined based on a time interval between the historical departure time and the current time. In some embodiments, the order predicting module 330 may determine the at least one candidate order based on a second rule. The second rule may relate to statistical analysis of the historical orders, for example, a frequency of a historical departure time, a frequency of a historical departure location, a frequency of a historical destination, or a frequency of a historical order type among the plurality of historical orders. As still another example, the order predicting module 330 may determine the at least one candidate order based on Bayesian Method, Monte Carlo method, any machine leaning method, or a combination thereof.

The order predicting module 330 may determine a predicted order based on feedback related to the at least one candidate order from the user. The feedback may include a selection of one candidate order among the at least one candidate order, information that modifies the at least one candidate order, information that confirms the at least one candidate order, or a combination thereof. In some embodiments, the order predicting module 330 may determine a predicted order based on received selection of the at least one candidate order. In some embodiments, the order predicting module 330 may determine a predicted order based on received information that modifies the at least one candidate order. In some embodiments, the order predicting module 330 may determine a predicted order based on received information that confirms the at least one candidate order.

The transmitting module 340 may transmit the at least one candidate order to the terminal device 130. In some embodiments, the at least one candidate order may include at least one of a candidate departure time, a candidate departure location, a candidate destination, or a candidate order type to the terminal device 130. In some embodiments, the transmitting module 340 may transmit a plurality of candidate orders to the terminal device 130. The plurality of candidate orders may include a plurality of candidate departure time, a plurality of candidate departure locations, a plurality of candidate destinations, or a plurality of candidate order types, etc. Each of the plurality of candidate orders may include a candidate departure time, a candidate departure location, a candidate destination, or a candidate order type, etc.

The transmitting module 340 may transmit the predicted order to the terminal device 130 and/or one or more driver equipments 140 in response to the request for an on-demand service.

The receiving module 310, the historical order acquisition module 320, the order predicting module 330, and the transmitting module 340 in the processing engine 112 may be connected to or communicate with each other via a wired connection, a wireless connection, or any combination thereof. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the receiving module 310, the historical order acquisition module 320, the order predicting module 330, and the transmitting module 340 may be combined as a single module. For example, the historical order acquisition module 320 may be integrated with the order predicting module 330 as a single module. The single module may determine a plurality of historical orders associated with the terminal device 130 and determine the at least one candidate order.

Figure 4:
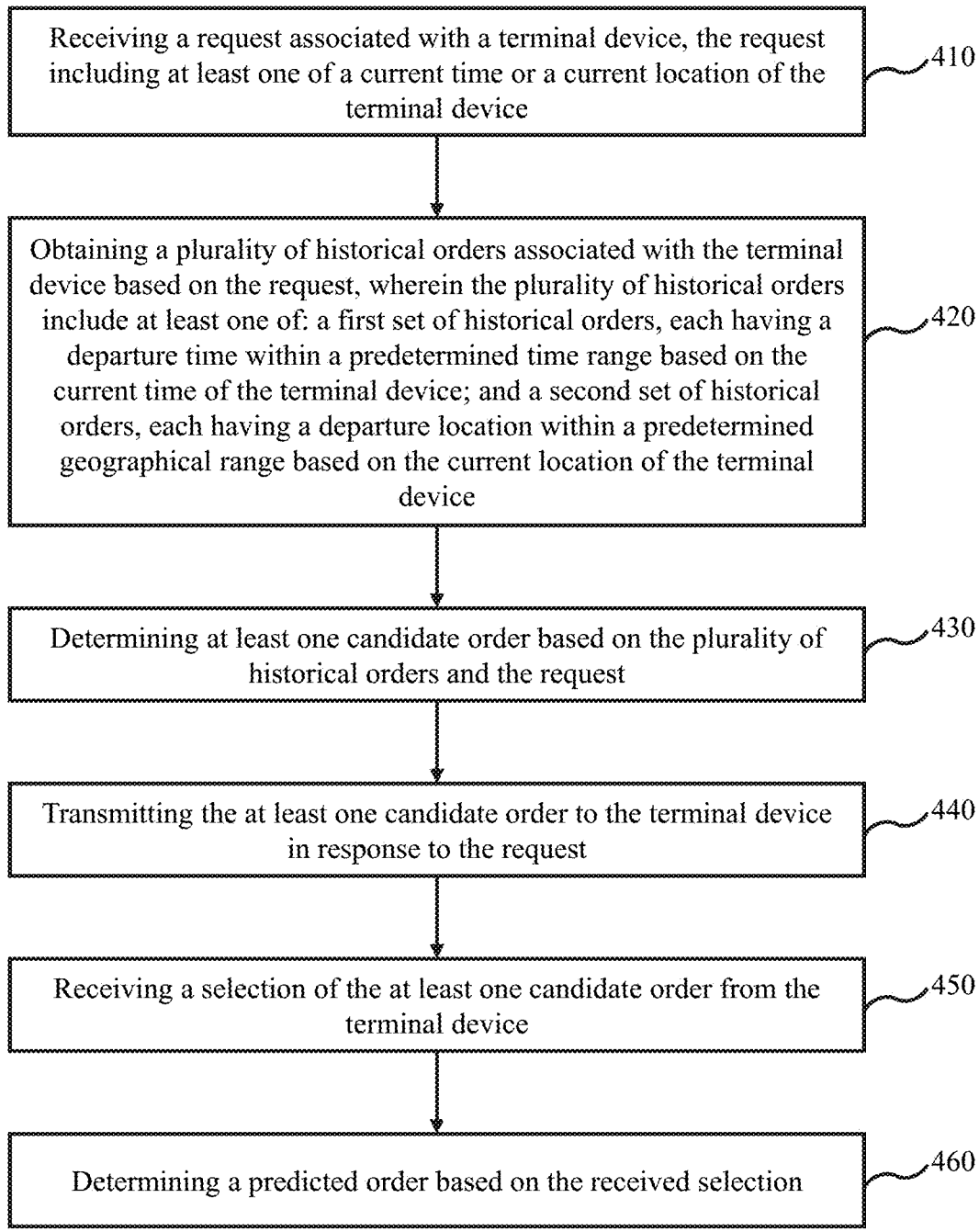
FIG. 4 illustrates an exemplary flowchart for determining a predicted order using the on-demand service system, according to some embodiments of the present disclosure.

FIG. 4 illustrates an exemplary flowchart 400 for determining a predicted order using the on-demand service system, according to some embodiments of the present disclosure. The flowchart 400 may be implemented as a set of instructions in a non-transitory storage medium of the server 110 of the system 100. The CPU 220 of the server 110 may execute the set of instructions and may accordingly perform the steps in the flowchart 400.

The operations of the illustrated flowchart 400 presented below are intended to be illustrative and not limiting. In some embodiments, the flowchart 400 may be accomplished with one or more additional operations not described, and/or without one or more of the operations discussed. Additionally, the order in which the operations of the flowchart 400 as illustrated in FIG. 4 and described below is not intended to be limiting.

In step 410, the receiving module 310 may receive a request for an on-demand service from a terminal device 130. The terminal device may be owned by a passenger. The request may be initiated via launching a service application, or manipulating one or more items (icons, buttons, etc.). The request may include at least one of a current time or a current location associated with the terminal device 130.

The current time may include a current time of a day (e.g., 5:20 p.m.) and/or a current date (e.g., Mar. 23, 2017). In some embodiments, the receiving module 310 may obtain the current time from the terminal device 130, the server 110, etc. It should be noted that the terminal device 130 and the server 110 may be in the same time zone or the different time zones. When the terminal device 130 and the server 110 are in the same time zone, the current time may be the system time of the terminal device 130 or the system time of the server 110. When the terminal device 130 and the server 110 are in different time zones, the current time may be the system time of the terminal device 130. In some embodiments, the receiving module 310 may further identify a date category with respect to the current time. The date category may suggest that the current time is a workday, a weekend, or a holiday. In some embodiments, the date category may be a user-customized category such mother's birthday, wedding anniversary, etc.

The current location may include a current latitude coordinate and a current longitude coordinate. The current location may include a description of an address, for example, a description including building numbers and street names. In some embodiments, the receiving module 310 may further identify a location category according to the current location. The location category may suggest that the current location is the user's home or workplace. The location category may be a user-customized category such as yoga April group meeting location, son's 2016 summer camp location, etc.

In step 420, the historical order acquisition module 320 may obtain a plurality of historical orders associated with the terminal device 130 based on the request. The historical orders may be initiated by the same terminal device 130, or the same passenger. Each of the plurality of historical orders may include a historical departure time, a historical departure location, a historical destination, a historical order type, etc. In some embodiments, the historical order acquisition module 320 may obtain all historical orders associated with the terminal device 130 stored in the database. In some embodiments, the historical order acquisition module 320 may obtain historical orders associated with the terminal device 130 within a period of time from the current time. For example, the historical order acquisition module 320 may obtain historical orders accomplished during the last year or the last six months. The historical order acquisition module 320 may obtain the plurality of historical orders associated with the terminal device 130 according to the current time, the current location, or a combination thereof.

In some embodiments, the plurality of historical orders may include a first set of historical orders, each having a historical departure time within a predetermined time range with respect to the current time of the terminal device 130. The predetermined time range may encompass the current time. The predetermined time range may have a duration of one hour, two hours, or any other period of time.

In some embodiments, the plurality of historical orders may include a second set of historical orders, each having a historical departure location within a predetermined geographical range with respect to the current location of the terminal device 130. The predetermined geographical range may be a rectangle, a polygon, a circle, or any other shaped region. The predetermined geographical range may be a range of a predetermined distance from the current location. The predetermined distance may be 0.5 kilometer, 1.0 kilometers, or any other distance.

In some embodiments, the plurality of historical orders may include a third set of historical orders, each having a historical departure time within a predetermined time range encompassing the current time and a historical departure location within a predetermined geographical range.

In some embodiments, the historical order acquisition module 320 may select one of the first set of historical orders, the second set of historical orders, or the third historical orders as the plurality of historical orders based on the numbers of historical orders in the first set, the second set, or the third set.

In step 430, the order predicting module 330 may determine at least one candidate order. In some cases, the order predicting module 330 may determine only one candidate order. While in some cases, the order predicting module 330 may determine a plurality of candidate orders.

In some embodiments, the order predicting module 330 may determine the at least one candidate order based on the plurality of historical orders and the request. In some embodiments, the order predicting module 330 may determine the at least one candidate order based on a posterior probability using Bayesian Method, Monte Carlo Method, any machine leaning method, or a combination thereof. In some embodiments, the order predicting module 330 may determine the at least one candidate order according to a first rule, a second rule, or a combination thereof.

Each of the candidate orders may include, at least one of one candidate departure time, at least one candidate departure location, at least one candidate destination, at least one candidate order type, or at least one predicted cost, etc.

The candidate departure time may be determined based on the current time associated with the terminal device 130 and an expected time specified by a user using the terminal device 130. For example, a request is received at 8:00 am on Mar. 1, 2016 with an expected pickup time of 9:30 am, a candidate order is generated and transmitted to the user for confirmation with a candidate departure time being 9:35 am.

In some embodiments, the order predicting module 330 may recommend one or two order types to the user to transport the user/passenger by comparing an average fare rate with respect to an order type and/or cost of the plurality of historical orders associated with the user/passenger. Merely by way of example, the order predicting module 330 may obtain a plurality of fare rates corresponding to a plurality of order types, respectively. The order predicting module 330 may determine the difference between the average cost of the plurality of historical orders and each of the plurality of far rates with respect to the plurality of order types. The order predicting module 330 may further select an order type corresponding to the smallest difference between its far rate and the average cost of the plurality of historical orders.

As another example, the order predicting module 330 may determine the predicted cost based on at least one of the candidate departure time, the candidate departure location, the candidate destination, the candidate order type, etc.

In step 440, the transmitting module 340 may transmit the at least one candidate order to the terminal device 130 in response to the request. In some embodiments, the transmitting module 340 may transmit to the terminal device 130, a candidate order including a candidate departure time, a candidate departure location, a candidate destination, or a candidate order type, etc. In some embodiments, the transmitting module 340 may transmit to the terminal device 130, a plurality of candidate orders. Each of the plurality of candidate orders may include a candidate departure time, a candidate departure location, a candidate destination, or a candidate order type, etc.

Merely by way of example, at 8:00 a.m. of Aug. 10, 2016, the receiving module 310 may receive from a terminal device 130, a current location at the south gate of residential community A. The historical order acquisition module 320 may obtain historical orders accomplished between 7:30 a.m. and 9:00 a.m. from Feb. 10 to Aug. 9, 2016. The order predicting module 330 may determine one or more candidate orders based on the obtained historical orders. The transmitting module 340 may transmit the one or more candidate orders to the terminal device 130. The receiving module 310 may receive the selection and/or confirmation from the terminal device 130 in order to generate a predicted order.

The on-demand service system may utilize various methods or processes to determine the candidate orders. The methods or processes may be based on rule-based evaluation or statistics.

In step 450, the receiving module 310 may receive a selection of the at least one candidate order from the terminal device 130. In some embodiments, the selection may be accomplished by a user via the terminal device 130. In some embodiments, the selection may be accomplished by the terminal device 130 through an instruction or application. For example, the user may preset an instruction or application to automatically choose a user-preferred order type (e.g., an express car order). The selected candidate order therefore, matches the user's personal preference with respect to the order type. In some embodiments, the received selection may include at least one of a selected departure time, a selected departure location, a selected destination, or a selected order type.

In step 460, the order predicting module 330 may determine a predicted order based on the received selection. In some embodiments, the received selection may include a selected candidate order. The order predicting module 330 may determine the selected candidate order as the predicted order. The order predicting module 330 may further generate a confirmed service order in the on-demand service system based on the predicted order and transmit the confirmed service order to at least the terminal device 130 and the driver equipment 140.

The above description is merely for illustrative purposes. It should be noted that those skilled in the art may contemplate additional or alternative steps besides the steps described in FIG. 4. For example, the transmitting module 340 may further transmit the predicted order to the terminal device 130 or at least one of the driver equipment 140. The transmission of the predicted order to the at least one driver equipment 140 may enable the drivers to prepare for providing the transportation service. The transmission of the predicted order to the terminal device 130 may inform the passenger that the system 100 has accepted and dispatched his/her service order.

Figure 5:
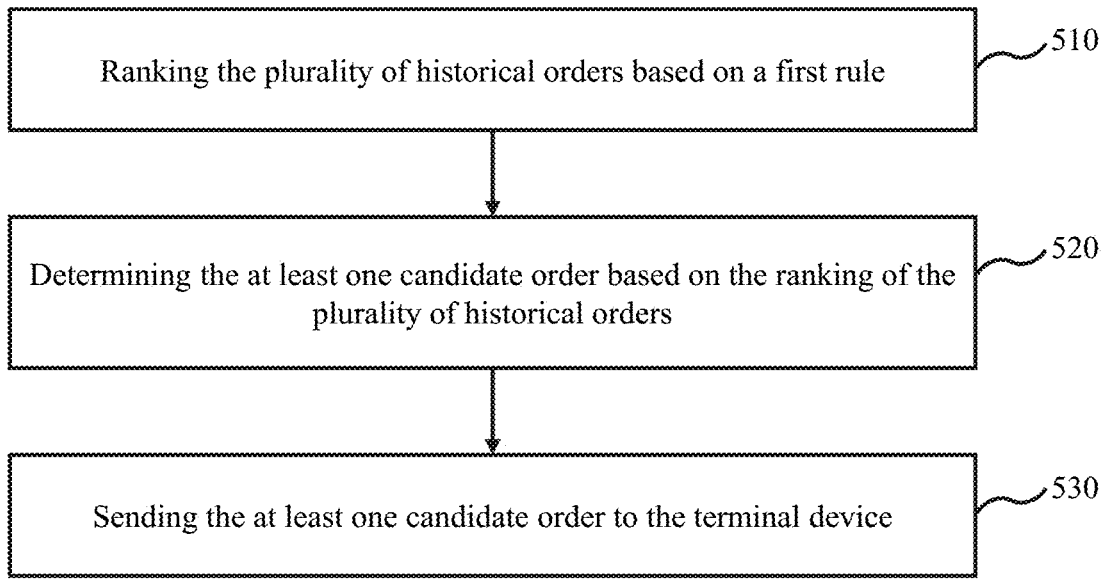
FIG. 5 illustrates an exemplary flowchart for determining at least one candidate order using the on-demand service system, according to some embodiments of the present disclosure.

FIG. 5 illustrates an exemplary flowchart 500 for determining at least one candidate order using the on-demand service system, according to some embodiments of the present disclosure. The flowchart 500 may be implemented as a set of instructions in a non-transitory storage medium of the server 110 of the system 100. The CPU 220 of the server 110 may execute the set of instructions and may accordingly perform the steps in the flowchart 500.

The operations of the illustrated flowchart 500 presented below are intended to be illustrative. In some embodiments, the flowchart 500 may be accomplished with one or more additional operations not described, and/or without one or more of the operations discussed. Additionally, the order in which the operations of the flowchart 500 as illustrated in FIG. 5 and described below is not intended to be limiting.

In step 510, the order predicting module 330 may rank the plurality of historical orders based on a first rule. The first rule may relate to an evaluation of the plurality of historical orders. Each of the plurality of historical orders may be evaluated and assigned a rating. The order predicting module 330 may determine the ranking based on the ratings of the plurality of historical orders. The ranking may be in an ascending order or a descending order. The order predicting module 330 may assign one or more weights to each of the plurality of historical orders. In some embodiments, the order predicting module 330 may determine the rating for each of the plurality of historical orders based on the one or more weights. In some embodiments, the rating for each of the plurality of historical orders may be determined based on a time interval between each historical departure time and the current time, a frequency of each historical departure location among the plurality of historical orders, a frequency of each historical destination among the plurality of historical orders, or a frequency of each historical order type among the plurality of historical orders. More details relating to the rating may be provided in connection with FIG. 6 and the description thereof.

In step 520, the order predicting module 330 may determine the at least one candidate order based on the ranking of the plurality of historical orders. In some embodiments, the number of the least one candidate order may be a positive integer (e.g., 1, 2, 3, 5, or any suitable positive integer). For example, the order predicting module 330 may determine three candidate orders based on the ranking. To be more specific, the order predicting module 330 may determine the top three historical orders in the ranking as the three candidate order. As another example, the order predicting module 330 may determine a historical order with the highest order in the ranking as the candidate order.

For example, the order predicting module 330 may select the most frequently accomplished historical order as a candidate order. The frequency of the historical order may be the ratio between the number of the historical order being accomplished and the total number of the plurality of the historical orders. The candidate order may include the same or similar information to the most frequently accomplished historical order such as, a same departure location, a close departure time, a same destination, or the same order type. For example, both have departure location within a circular geographical range of 100 meters. As another example, both have departure time between 7:10 p.m. to 7:30 p.m. In some embodiments, the order predicting module 330 may further determine whether the frequency of one historical order is greater than a threshold. The threshold may be predetermined by the on-demand service, for example, 0.4, 0.5, 0.6, etc. In response to a determination that the frequency of the historical order is greater than the threshold, the order predicting module 330 may determine a candidate order based on the historical departure time, the historical departure location, the historical destination, or the historical order type of the historical order directly.

In step 530, the transmitting module 340 may send the at least one candidate order to the terminal device 130 in response to the request. The detail relating to the sending of candidate order is provided in connection with FIG. 4, which will not be repeated here.

Figure 6:
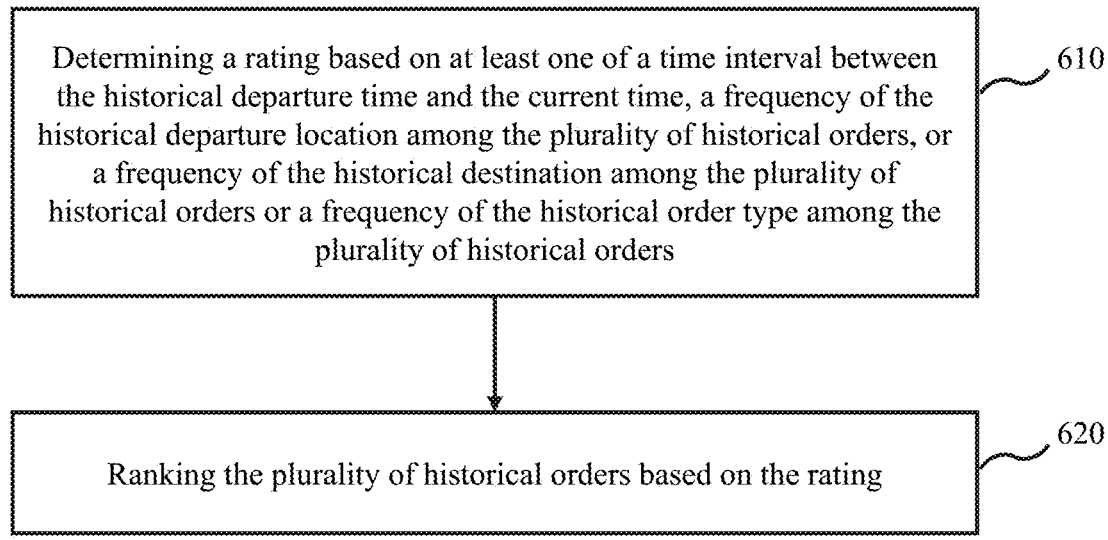
FIG. 6 illustrates an exemplary flowchart for ranking a plurality of historical orders using the on-demand service system, according to some embodiments of the present disclosure.

FIG. 6 illustrates an exemplary flowchart 600 for ranking a plurality of historical orders using the on-demand service system, according to some embodiments of the present disclosure. The flowchart 600 may be implemented as a set of instructions in a non-transitory storage medium of the server 110 of the system 100. The CPU 220 of the server 110 may execute the set of instructions and may accordingly perform the steps in the flowchart 600.

The operations of the illustrated flowchart 600 presented below are intended to be illustrative. In some embodiments, the flowchart 600 may be accomplished with one or more additional operations not described, and/or without one or more of the operations discussed. Additionally, the order in which the operations of the flowchart 600 as illustrated in FIG. 6 and described below is not intended to be limiting.

In step 610, for each of the plurality of historical orders, the order predicting module 330 may determine a rating based on at least one of a time interval between the historical departure time and the current time, a frequency of the historical departure location among the plurality of historical orders, or a frequency of the historical destination among the plurality of historical orders or a frequency of the historical order type among the plurality of historical orders. The rating may indicate a similarity between the historical condition (including historical information related to time, location, destination, order type, etc.) of a historical order and the current condition (including current time, current location, etc.).

The time interval between the historical departure time and the current time may be determined by a difference between the historical departure time and the current time. In some embodiments, the order predicting module 330 may assign a greater rating to a historical order associated with a smaller time interval.

The frequency of a historical departure location among the plurality of historical orders may refer to the ratio between the number of historical orders including the historical departure location and the total number of the plurality of the historical orders. In some embodiments, the order predicting module 330 may assign a greater rating to a historical order with a greater frequency of a historical departure location.

The frequency of a historical destination among the plurality of historical orders may refer to the ratio between the number of historical orders including the historical destination and the total number of the plurality of the historical orders. In some embodiments, the order predicting module 330 may assign a greater rating to a historical order with a greater frequency of a historical destination.

The frequency of a historical order type among the plurality of historical orders may refer to the ratio between the number of historical orders including the historical order type and the total number of the plurality of the historical orders. In some embodiments, the order predicting module 330 may assign a greater rating to a historical order with a greater frequency of a historical order type.

In some embodiments, the order predicting module 330 may assign a weight to each of the plurality of parameters with respect to a historical order (the departure time, the departure location, the destination, and the order type). The weights assigned to different parameters may be the same or different. A parameter with a larger weight may be predominant. The order predicting module 330 may determine a product by multiplying a weight to its corresponding parameter. The order predicting module 330 may determine the rating of the historical order based on the sum of the products associated with the plurality of parameters.

For purposes of illustration, the order predicting module 330 may assign a weight $\alpha$ to the historical departure time, a weight $\beta$ to the historical departure location, a weight $\gamma$ to the historical destination, a weight $\delta$ to the historical departure time, and a weight $\varepsilon$ to the historical cost. The weights $\alpha$, $\beta$, $\gamma$, $\delta$, and $\varepsilon$ may be a real number (e.g., 0.01, 0.05, 0.1, 0.2, 0.3, 1, 2, etc.). In some embodiments, the sum of the weights $\alpha$, $\beta$, $\gamma$, $\delta$, and $\varepsilon$ may be 1 or any suitable number. For example, the weight $\alpha$ is 0.3, the weight $\beta$ is 0.3, the weight $\gamma$ is 0.3, the weight $\delta$ is 0.05, and the weight $\varepsilon$ is 0.05. The order predicting module 330 may further determine a rating for each of the plurality of historical orders based on the weights $\alpha$, $\beta$, $\gamma$, $\delta$, and $\varepsilon$.

In step 620, the order predicting module 330 may rank the plurality of historical orders based on the ratings associated with the plurality of historical orders. The ranking may be in an ascending order or a descending order. When the ranking is in an ascending order, a historical order with the smallest rating among the plurality of historical orders may be in the top place. When the ranking is in a descending order, a historical order with the largest rating among the plurality of historical orders may be in the top place.

In some embodiments, the order predicting module 330 may filter the plurality of historical orders by performing one or more rankings. For example, the order predicting module 330 may first rank the plurality of historical orders and determine a first ranking. The order predicting module 330 may further select at least two historical orders from the plurality of historical orders based on the first ranking. The order predicting module 330 may rank the at least two historical orders and determine a second ranking. The principles, rules, or criteria in the first ranking and the second ranking may be identical or different. In some embodiments, the number of the selected historical orders may be a predetermined number (e.g., ten). In some embodiments, the number of the selected historical orders may be determined dynamically. For example, the number of the selected historical orders may be determined based on a rule related to the first ranking.

For purposes of illustration, the order predicting module 330 may first rank the plurality of historical orders based on a frequency of a historical destination among the plurality of historical orders. The order predicting module 330 may determine a first ranking. The first ranking may be in a descending order. The order predicting module 330 may determine one or more frequently-visited historical (e.g., building B, airport C, residential community D) based on the first ranking. The order predicting module 330 may further determine at least two historical orders from the one or more frequently-visited historical destinations. The order predicting module 330 may further rank the at least two historical orders based on a time interval between a historical departure time and the current time. The order predicting module 330 may determine a second ranking. The second ranking may be in an ascending order. For example, based on the second ranking, the order predicting module 330 may determine an express car order from the current location (e.g., residential community A) to the building B as the first order, an express car order from the current location to the airport C as the second order, and an express car order from the current location to the residential community D as the third order.

In some embodiments, the order predicting module 330 may determine a candidate order based on a second rule. The second rule may be based on statistics information associated with the historical orders.

In some embodiments, the second rule may relate to a frequency of each historical departure time among the plurality of historical orders, a frequency of each historical departure location among the plurality of historical orders, a frequency of each historical destination among the plurality of historical orders, a frequency of each historical order type among the plurality of historical orders, etc. The frequency of a historical departure time among the plurality of historical orders may refer to the ratio between the number of historical orders including the historical departure time and the total number of the plurality of the historical orders. The frequency of a historical departure location among the plurality of historical orders may refer to the ratio between the number of historical orders including the historical departure location and the total number of the plurality of the historical orders. The frequency of a historical destination among the plurality of historical orders may refer to the ratio between the number of historical orders including the historical destination and the total number of the plurality of the historical orders. The frequency of a historical order type among the plurality of historical orders may refer to the ratio between the number of historical orders including the historical order type and the total number of the plurality of the historical orders.

In some embodiments, the order predicting module 330 may determine a candidate departure time based on the frequencies of historical departure times. In some embodiments, the order predicting module 330 may determine a candidate departure location based on the frequencies of the historical departure locations. In some embodiments, the order predicting module 330 may determine a candidate destination based on the frequencies of the historical destinations. In some embodiments, the order predicting module 330 may determine a candidate order type based on the frequencies of the historical orders. Merely by way of example, the order predicting module 330 may determine a most frequent historical departure time as a candidate departure time. The order predicting module 330 may determine the most frequent historical departure location as a candidate departure location. The order predicting module 330 may determine the most frequent historical destination as a candidate destination. The order predicting module 330 may determine the most frequent historical order type as a candidate order type. The order predicting module 330 may combine the candidate departure time, the candidate departure location, the candidate destination, the candidate order type and determine a candidate order.

Merely by way of example, at 8:30 a.m. of Aug. 10, 2016, the receiving module 310 may receive from a terminal device 130 of a user, a current location at the south gate of residential community A. The historical order acquisition module 320 may obtain historical orders accomplished between 7:30 a.m. and 9:00 a.m. from Feb. 10 to Aug. 9, 2016. The order predicting module 330 may determine that the south gate of residential community A is the most frequent departure location. The order predicting module 330 may determine that building B is the most frequent destination. The order predicting module 330 may determine that express car order is the most frequent order type. The order predicting module 330 may further determine a candidate order including residential community A as candidate departure location, building B as the candidate destination, and express car order as the candidate order type. The transmitting module 340 may transmit the candidate order to the terminal device 130 of the user confirmation.

In some cases, after receiving candidate orders from the on-demand service system 100, the user may respond to the candidate orders. The response may include modification or confirmation of the candidate orders from the user. After receiving the response from the user, the system 100 may generate a service order. In some scenarios, the candidate orders may not meet the user's requirements, the user may modify one or more parameters in the candidate orders and notify the on-demand service system 100 with the modification. If the candidate order meets the user's requirements, the user may confirm the candidate order.

Figure 7:
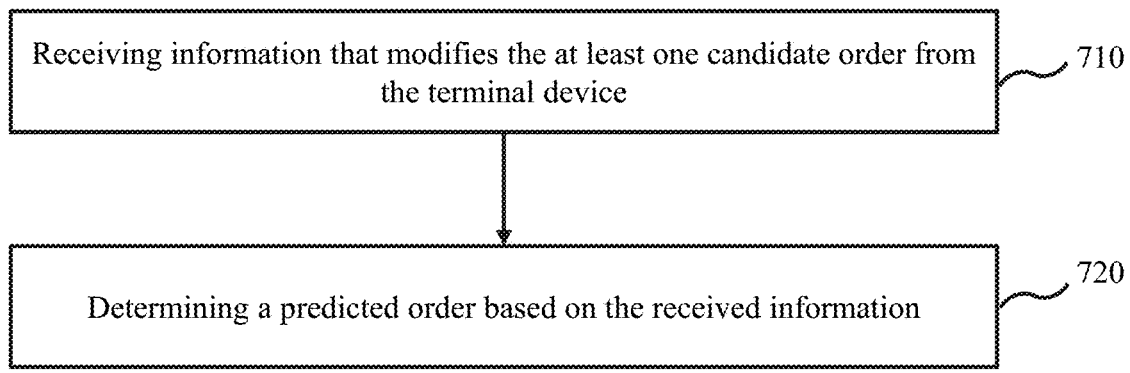
FIG. 7 illustrates an exemplary flowchart for determining a predicted order based on information that modifies the at least one candidate order, according to some embodiments of the present disclosure.

FIG. 7 illustrates an exemplary flowchart 700 for determining a predicted order based on information that modifies the at least one candidate order according to some embodiments of the present disclosure. The flowchart 700 may be implemented as a set of instructions in a non-transitory storage medium of the server 110 of the system 100. The CPU 220 of the server 110 may execute the set of instructions and may accordingly perform the steps in the flowchart 700.

The operations of the illustrated flowchart 700 presented below are intended to be illustrative. In some embodiments, the flowchart 700 may be accomplished with one or more additional operations not described, and/or without one or more of the operations discussed. Additionally, the order in which the operations of the flowchart 700 as illustrated in FIG. 7 and described below is not intended to be limiting.

In step 710, the receiving module 310 may receive information that modifies the at least one candidate order from the terminal device 130. In some embodiments, the information may include one or more modified parameters (e.g., a modified departure time, a modified departure location, a modified destination, a modified order type, etc.). For example, a user may modify a candidate destination based on the at least one candidate order via the terminal device 130.

In step 720, the order predicting module 330 may determine a predicted order based on the received information. In some embodiments, the predicted order may be generated based on the received information. For example, the order predicting module 330 may determine the predicted order based on the candidate order and at least one of the modified departure time, the modified departure location, the modified destination, or the modified order type.

Merely by way of example, the candidate order may include the south gate of residential community A as candidate departure location, building B as candidate destination, and express car as candidate order type. However, the south gate of residential community A is impassable due to construction. The user may change the departure location from the south gate to the west gate and send the modification to the system 100 via the terminal device 130. After receiving the modification, the system 100 may generate a predicted order including the west gate of residential community A as departure location.

Figure 8:
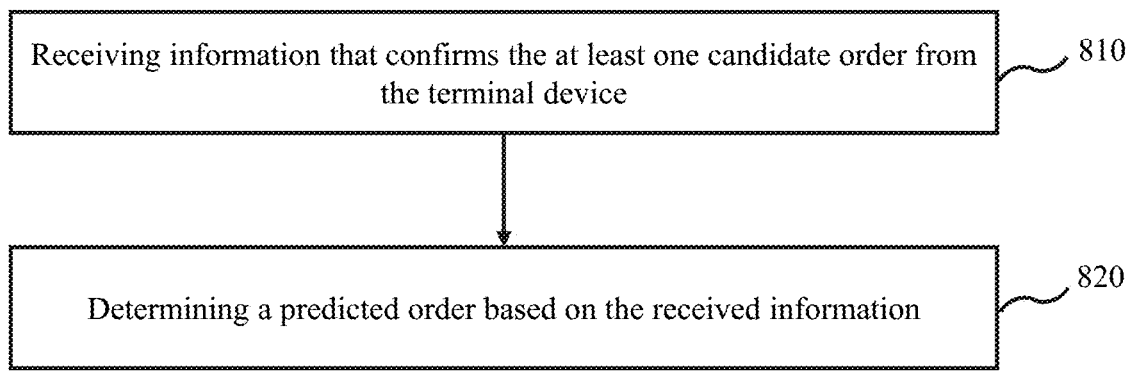
FIG. 8 illustrates an exemplary flowchart for determining a predicted order based on information that confirms the at least one candidate order, according to some embodiments of the present disclosure.

FIG. 8 illustrates an exemplary flowchart 800 for determining a predicted order based on information that confirms the at least one candidate order according to some embodiments of the present disclosure. The flowchart 800 may be implemented as a set of instructions in a non-transitory storage medium of the server 110 of the system 100. The CPU 220 of the server 110 may execute the set of instructions and may accordingly perform the steps in the flowchart 800.

The operations of the illustrated flowchart 800 presented below are intended to be illustrative. In some embodiments, the flowchart 800 may be accomplished with one or more additional operations not described, and/or without one or more of the operations discussed. Additionally, the order in which the operations of the flowchart 800 as illustrated in FIG. 8 and described below is not intended to be limiting.

In step 810, the receiving module 310 may receive information that confirms the at least one candidate order from the terminal device 130. In some embodiments, the information may include one or more confirmed parameters (e.g., a confirmed departure time, a confirmed departure location, a confirmed destination, a confirmed order type, etc.). In some embodiments, the information may be sent by a user via the terminal device 130. In some embodiments, the information may be sent by the user in one or more times. For example, the user may confirm the candidate destination first and send the first confirmation via the terminal device 130. Later, the user may confirm the candidate order type and send the second confirmation via the terminal device 130.

In step 820, the order predicting module 330 may determine a predicted order based on the received information. In some embodiments, the predicted order may include a selected/confirmed order from the at least one candidate order. In some embodiments, the predicted order may be generated based on the confirmed information. For example, the order predicting module 330 may determine the predicted order based on at least one of the confirmed departure time, the confirmed departure location, the confirmed destination, or the confirmed order type.

The above description is merely for illustrative purposes. It should be noted that those skilled in the art may contemplate additional or alternate steps besides the steps described in FIG. 8. For example, the transmitting module 340 may further transmit the predicted order to the terminal device 130 or at least one of driver equipment 140. The transmission of the predicted order to the at least one driver equipment 140 may enable the drivers to prepare for providing the transportation service. The transmission of the predicted order to the terminal device 130 may inform the passenger that the system 100 has accepted and dispatched his/her service order.

Figure 9:
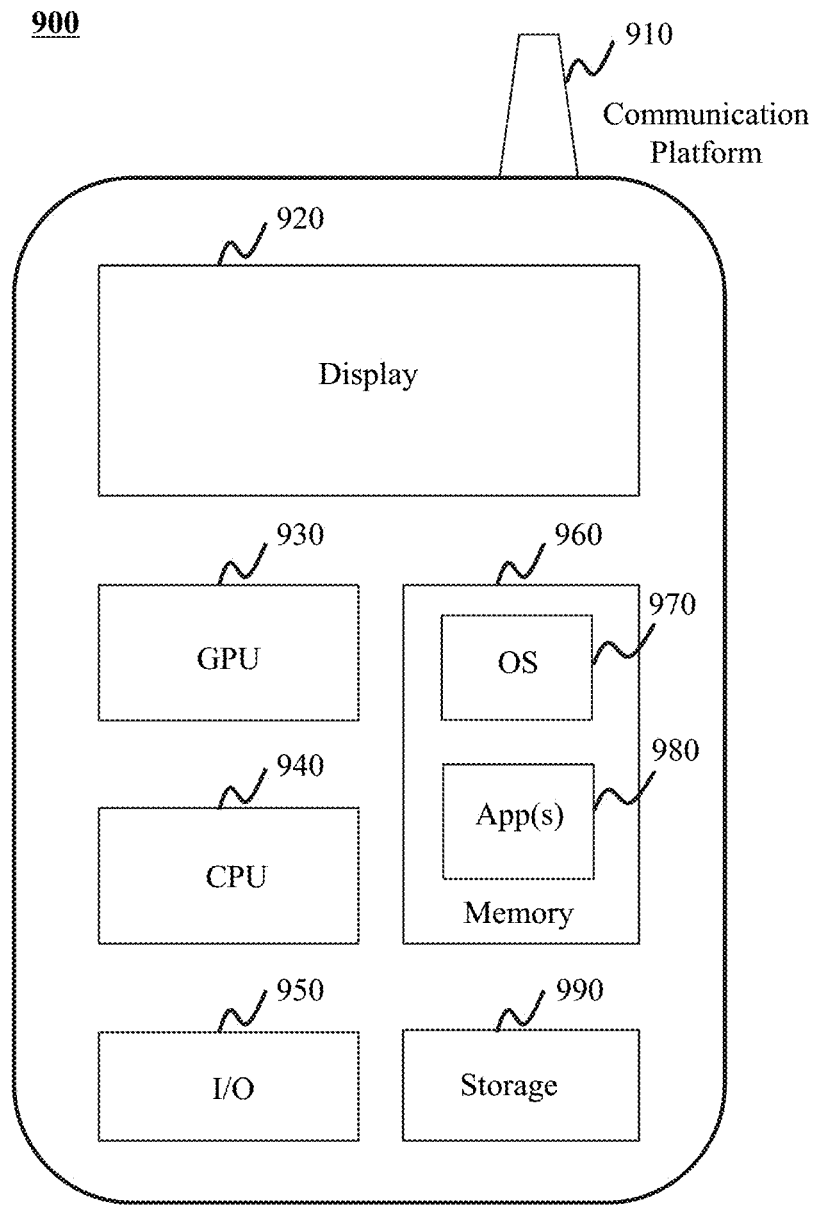
FIG. 9 illustrates an exemplary mobile device on which the on-demand service can be implemented, according to some embodiments of the present disclosure.

FIG. 9 illustrates an exemplary mobile device 900 on which the on-demand service can be implemented according to some embodiments of the present disclosure.

As illustrated in FIG. 9, the mobile device 900 may include a communication platform 910, a display 920, a graphic processing unit (GPU) 930, a central processing unit (CPU) 940, an I/O 950, a memory 960, and a storage 990. In some embodiments, any other suitable component, including but not limited to a system bus or a controller (not shown), may also be included in the mobile device 900. In some embodiments, a mobile operating system 970 (e.g., iOS™, Android™, Windows Phone™, etc.) and one or more applications 980 may be loaded into the memory 960 from the storage 990 in order to be executed by the CPU 940. The applications 980 may include a browser or any other suitable mobile apps for receiving and rendering information relating to an order (e.g., a departure time, a departure location, a destination, an order type, cost, etc.) from the processing engine 112 and/or the database 160. User interactions with the information stream may be achieved via the I/O 950 and provided to the processing engine 112 and/or other components of the on-demand service system 100 via the network 120.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a server if appropriately programmed.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by the present disclosure, and are within the spirit and scope of the exemplary embodiments of the present disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "module," "unit," "component," "device" or "system." Furthermore, aspects of the present disclosure may take the form of a computer program product embodied in one or more non-transitory computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter lie in less than all features of a single foregoing disclosed embodiment.

We claim:

1. A system providing on-demand transportation services, comprising:
   at least one non-transitory computer-readable storage medium including a set of instructions;
   at least one processor in communication with the at least one non-transitory computer-readable storage medium, wherein when executing the set of instructions, the at least one processor including an order predicting module that uses Bayesian Method, Monte Carlo method, a machine learning method, or a combination thereof, wherein the at least one processor is directed to:
   receive a real-time request initiated by one or more buttons being manipulated on an interface of the service application displayed on a terminal device, the request including at least one of a current time or a current location of the terminal device, wherein the current location is determined by a positioning system;
   obtain, based on the request, a plurality of historical orders associated with the terminal device by accessing stored data in a database via a network;
   automatically predict, by the order predicting module using the Bayesian Method, the Monte Carlo method, the machine learning method, or the combination thereof, at least one candidate order based on a plurality of parameters related to a historical departure time, a historical departure location, a historical destination, and historical order type of the plurality of historical orders and a departure time, a departure location, a destination, and an order type of the request, wherein the at least one candidate order includes at least one candidate order type corresponding to a smallest difference between an average cost of the plurality of historical orders and each of a plurality of fare rates with respect to a plurality of order types;
   transmit to and display on the interface of the terminal device the at least one candidate order in response to the request;
   receive a feedback from the terminal device, wherein the feedback corresponds a modification operation on the interface displayed on the terminal device and the modification operation includes modification to at least one of the plurality of parameters related to a departure time, a departure location, a destination, and an order type of the request;
   modify the at least one candidate order based on the feedback;
   transmit to and display on the interface of the terminal device the at least one modified candidate order;
   wherein the plurality of historical orders include:
      a first set of historical orders, each having a historical departure time within a predetermined time range based on the current time of the terminal device; and
      a second set of historical orders, each having a historical departure location within a predetermined geographical range based on the current location of the terminal device.

2. The system of claim 1, wherein the predetermined geographical range is a range of a predetermined distance from the current location.

3. The system of claim 1, wherein the at least one candidate order includes at least one of a candidate departure time, a candidate departure location, a candidate destination, or a candidate order type.

4. The system of claim 1, wherein the at least one processor is further directed to:
rank the plurality of historical orders based on a first rule;
determine the at least one candidate order based on the ranking of the plurality of historical orders.

5. The system of claim 4, wherein the first rule is configured based on at least one of:
a time interval between the historical departure time and the current time,
a frequency of the historical departure location among the plurality of historical orders,
a frequency of the historical destination among the plurality of historical orders, or
a frequency of the historical order type among the plurality of historical orders.

6. The system of claim 1, wherein to determine the at least one candidate order based on the plurality of historical orders and the request, the at least one processor is further directed to:
determine the at least one candidate order based on a second rule.

7. The system of claim 6, wherein the second rule is configured based on at least one of:
a most frequent historical departure time,
a most frequent historical departure location,
a most frequent historical destination, or
a most frequent historical order type.

8. The system of claim 1, wherein the at least one processor is further directed to:
receive a selection of the at least one modified candidate order from the terminal device; and
determine a predicted order based on the received selection.

9. The system of claim 1, wherein the at least one processor is further directed to:
receive information that confirms the at least one modified candidate order from the terminal device; and
determine a predicted order based on the received information.

10. A method providing on-demand transportation services implemented on a computing device having at least one processor including an order predicting module that uses Bayesian Method, Monte Carlo method, a machine learning method, or a combination thereof, at least one non-transitory computer-readable storage medium, and a communication platform connected to a network, comprising:
receiving a real-time request initiated by one or more buttons being manipulated on an interface of the service application displayed on a terminal device, the request including at least one of a current time or a current location of the terminal device, wherein the current location is determined by a positioning system;
obtaining, based on the request, a plurality of historical orders associated with the terminal device by accessing stored data in a database via the network;
automatically predicting, by the order predicting module using the Bayesian Method, the Monte Carlo method, the machine learning method, or the combination thereof, at least one candidate order based on a plurality of parameters related to a historical departure time, a historical departure location, a historical destination, and historical order type of the plurality of historical orders and a departure time, a departure location, a destination, and an order type of the request, wherein the at least one candidate order includes at least one candidate order type corresponding to a smallest difference between an average cost of the plurality of historical orders and each of a plurality of fare rates with respect to a plurality of order types;
transmitting to and displaying on the interface of the terminal device the at least one candidate order in response to the request;
receiving a feedback from the terminal device, wherein the feedback corresponds a modification operation on the interface displayed on the terminal device and the modification operation includes modification to at least one of the plurality of parameters related to a departure time, a departure location, a destination, and an order type of the request;
modifying the at least one candidate order based on the feedback;
transmitting to and displaying on the interface of the terminal device the at least one modified candidate order;
wherein the plurality of historical orders include:
a first set of historical orders, each having a historical departure time within a predetermined time range based on the current time of the terminal device; and
a second set of historical orders, each having a historical departure location within a predetermined geographical range based on the current location of the terminal device.

11. The method of claim 10, further comprising:
ranking the plurality of historical orders based on a first rule;
determining the at least one candidate order based on the ranking of the plurality of historical orders.

12. The method of claim 11, wherein the first rule is configured based on at least one of:
a time interval between a historical departure time and the current time,
a frequency of the historical departure location among the plurality of historical orders,
a frequency of the historical destination among the plurality of historical orders, or
a frequency of a historical order type among the plurality of historical orders.

13. The method of claim 10, further comprising:
determining the at least one candidate order based on a second rule.

14. The method of claim 13, wherein the second rule is configured based on at least one of:
a most frequent historical departure time,
a most frequent historical departure location,
a most frequent historical destination, or
a most frequent historical order type.

15. The method of claim 10, further comprising:
receiving a selection of the at least one modified candidate order from the terminal device; and
determining a predicted order based on the received selection.

16. The method of claim 10, further comprising:
receiving information that confirms the at least one modified candidate order from the terminal device; and
determining a predicted order based on the received information.

17. A non-transitory computer readable medium embodying a computer program product providing on-demand transportation services, the computer program product comprising instructions configured to cause a computing system to:
receive a real-time request initiated by one or more buttons being manipulated on an interface of the service application displayed on a terminal device, the request including at least one of a current time or a current location of the terminal device;

obtain, based on the request, a plurality of historical orders associated with the terminal device by accessing stored data in a database via a network;

automatically predict, by an order predicting module using Bayesian Method, Monte Carlo method, a machine learning method, or a combination thereof, at least one candidate order based on a plurality of parameters related to a historical departure time, a historical departure location, a historical destination, and historical order type of the plurality of historical orders and a departure time, a departure location, a destination, and an order type of the request, wherein the at least one candidate order includes at least one candidate order type corresponding to a smallest difference between an average cost of the plurality of historical orders and each of a plurality of fare rates with respect to a plurality of order types;

transmit to and display on the interface of the terminal device the at least one candidate order in response to the request;

receive a feedback from the terminal device wherein the feedback corresponds a modification operation on the interface displayed on the terminal device and the modification operation includes modification to at least one of the plurality of parameters related to a departure time, a departure location, a destination, and an order type of the request;

modify the at least one candidate order based on the feedback;

transmit to and display on the interface of the terminal device the at least one modified candidate order;

wherein the plurality of historical orders include:
  a first set of historical orders, each having a historical departure time within a predetermined time range based on the current time of the terminal device; and
  a second set of historical orders, each having a historical departure location within a predetermined geographical range based on the current location of the terminal device.

18. The non-transitory computer readable medium of claim 17, wherein the computer program product further comprises instructions configured to cause the computing system to:
  rank the plurality of historical orders based on a first rule;
  determine the at least one candidate order based on the ranking of the plurality of historical orders.

19. The non-transitory computer readable medium of claim 18, wherein the first rule is configured based on at least one of:
  a time interval between the historical departure time and the current time,
  a frequency of the historical departure location among the plurality of historical orders,
  a frequency of a historical destination among the plurality of historical orders, or
  a frequency of a historical order type among the plurality of historical orders.

20. The non-transitory computer readable medium of claim 17, wherein the computer program product further comprises instructions configured to cause the computing system to:
  determine the at least one candidate order based on a second rule.

* * * * *